M. WESTRA.
TRACTION COUPLING.
APPLICATION FILED JULY 22, 1908.
942,764.
Patented Dec. 7, 1909.
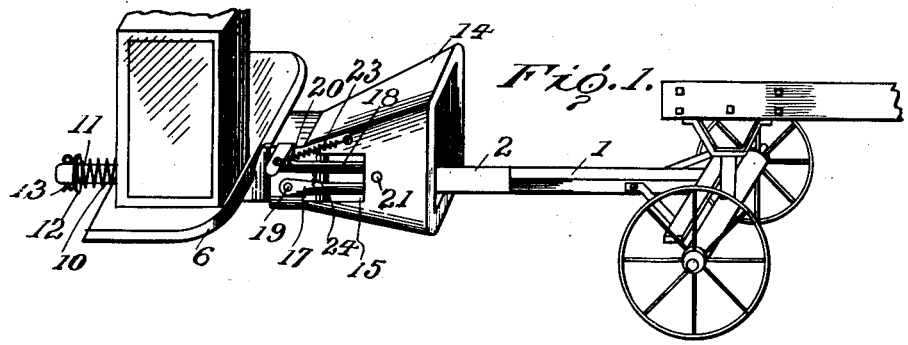
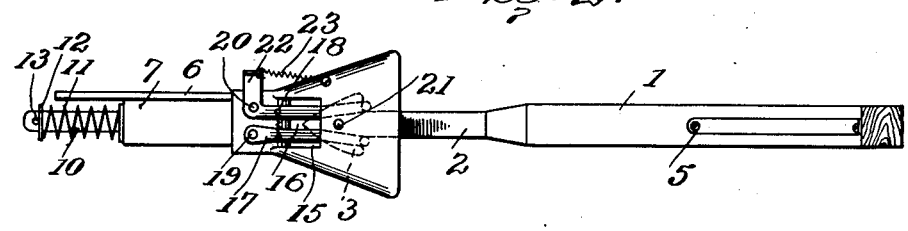
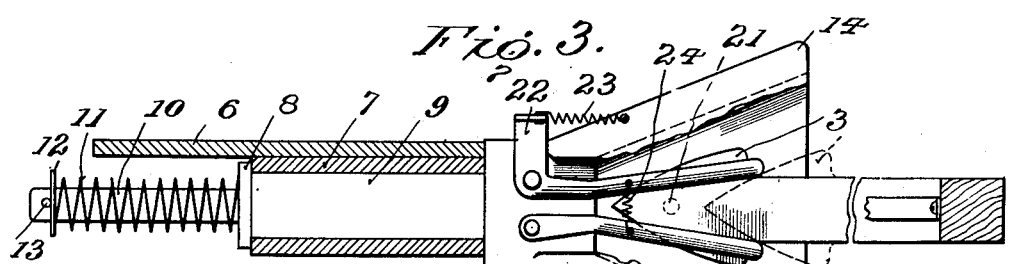
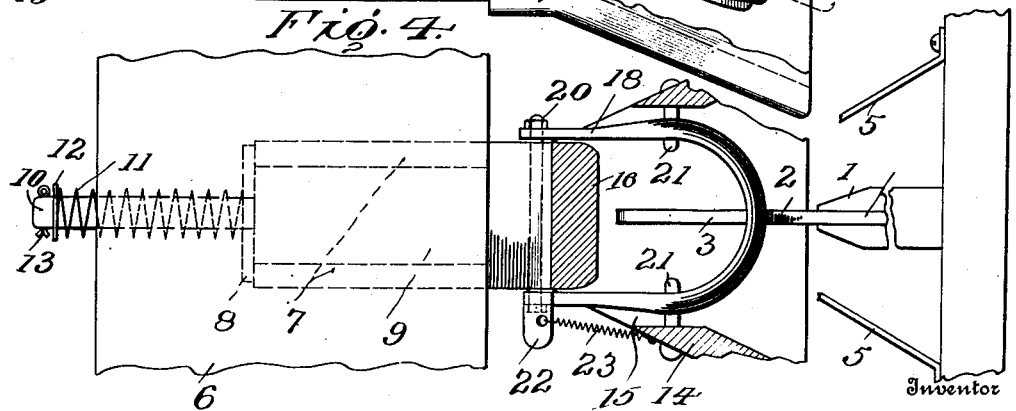
Inventor
Mike Westra.

UNITED STATES PATENT OFFICE.

MIKE WESTRA, OF ORANGE CITY, IOWA.

TRACTION-COUPLING.

942,764.  Specification of Letters Patent.  Patented Dec. 7, 1909.

Application filed July 22, 1908. Serial No. 444,850.

*To all whom it may concern:*

Be it known that I, MIKE WESTRA, citizen of the United States, residing at Orange City, in the county of Sioux and State of Iowa, have invented certain new and useful Improvements in Traction - Couplings, of which the following is a specification.

This invention contemplates the construction of a coupler for connecting traction engines with wheeled farming machinery.

The objects of this invention are to provide an improved construction of traction coupler, a traction coupler which possesses all of the advantages required of a device of this character and one which is strong, durable and simple in construction and which at the same time embodies the improved formation.

With these and other objects in view, this invention comprises certain combinations, constructions and arrangements of parts shown in the accompanying drawings and described in the specification and claim.

For a full understanding of the invention, reference is to be had to the following description and accompanying drawings, in which:

Figure 1 is a perspective view of my improved coupler connecting a traction engine and a separator tongue, Fig. 2 is a side elevation thereof, Fig. 3 is an enlarged side view partly in section, and, Fig. 4 is a top view partly in section.

Corresponding and like parts are referred to in the following description and indicated in all the views of the drawings by the same reference characters.

In the drawings numeral 1 designates a vehicle tongue, which is provided with a head piece 2. The head piece 2 is formed of metal, with a spear shaped end portion 3, and is secured to the tongue 1 in any suitable manner, the tongue itself being held in position by the braces 5.

Numeral 6 designates a securing plate formed with a housing 7, and provided with an end plate 8. A shaft 9, formed with a narrowed portion 10, is slidably secured in the housing 7 by means of the plate 8. The narrowed shaft portion 10 carries a spring 11 which is secured thereon by means of a washer 12 and a pin 13. The spring normally holds the shaft 9 in the housing 7. The shaft 9 carries a guide member 14, which is formed substantially funnel-shaped throughout. The guide member 14 is formed with side openings 15 and interior abutting portion 16. The guide member 14 carries a plurality of coupler members 17 and 18, formed preferably U-shaped, which extend through the openings 15 from their pivots 19 and 20. Member 17 engages a stop pin 21 which extends through one of the walls of guide member 14; member 18 is formed with a projecting bent end portion 22 which extends upwardly through the guide 14 from the pivotal point of the member 18 to form an arm by which the member 18 is operated, and is normally held against the stop pin 21 by a spring 23 which is connected at one of its ends to the arm 22, and at the other end to the guide member 14. Member 17 is connected to member 18 by a spring 24.

The tongue 1 carrying the head piece 2 may be secured to any wheeled agricultural machine such as a separator, harvester, reaper or other machine, and the securing plate 6 may be connected to any traction engine. When it is desired to connect a traction engine, provided with the coupler members 17 and 18 pivotally secured on the guide member 14, to a separator or other machine, provided with the tongue 1 and the head piece 2, all that is necessary to do, is to insert the head piece 2 between the walls of guide member 14 so that the spear point 3 comes into engagement with the coupler members 17 and 18, thus forcing member 18 upward and member 17 downward, until the spear point is passed, when the members 17 and 18 will slide onto the body portion of head piece 2.

To release or disconnect the traction engine from the separator, the coupler member 18 is raised through the medium of the projection 22 when the spear head 3 is held in position by the member 17. The tension between the traction engine and the separator causes an upward strain upon the spear head 3 and causes the springing of the same from engagement with the member 17 which will thereby release the spear head 3 from the coupling. The member 18 is swung upwardly which will cause the loop or crossbar of the same to advance outwardly from the shoulder of the spear head 3, the member 18 being engaged against the upper wall of the guide 14 thereby permitting of the passage of the spear head 3 out of the guide 14. In the process of disconnection, the member 18 is raised against the tension of the spring 23 by the arm 22 to the upper wall of the guide 14; during this process the lower member 17, now supporting the whole weight of the arrow head, is not maintained in parallelism with the upper member 18 because of the weakness of the spring 24; and the pull of the member 17 upon the tongue is exerted at a point beneath the medial line resulting in an upward swinging of the arrow head out of engagement with the member 17. The member 17 is arrested in its upward movement by the stops 21 which retain the same out of parallelism with the line of draft and permit of the passage of the arrow head 3 outwardly between the member 17 and the wall of the guide 14.

The spring 11 tends to absorb the strain of a load on the tongue 1 when a traction engine is moving a machine from a stationary position. It will be seen that the head piece 2 may be moved horizontally when connected to members 17 and 18, thus enabling a machine pulled by a traction engine to properly adjust itself to curves.

What I claim and desire to secure by Letters Patent is:

In a coupling as specified the combination of a guide, U-shaped locking members pivotally mounted in said guide, a spring engaged by the said locking members for normally contracting the same, a spear head adapted for engagement between said locking members, an arm projected outwardly of said guide from the upper of said locking members at the pivotal end of the same and adapted to raise said upper locking member from said spear head, and stops inwardly extended from said guide between said locking members for engagement with the lower of said locking members when the same is drawn upwardly by said spring out of the line of draft to admit of the springing of said spear head therefrom.

In testimony whereof I affix my signature in presence of two witnesses.

MIKE WESTRA. [L. S.]

Witnesses:
W. F. RIECKHOFF,
J. F. DE YOUNG.